H. W. BROWN.
ELECTRIC MEASURING INSTRUMENT.
APPLICATION FILED JAN. 21, 1909.
1,013,123.
Patented Jan. 2, 1912.
2 SHEETS—SHEET 1.
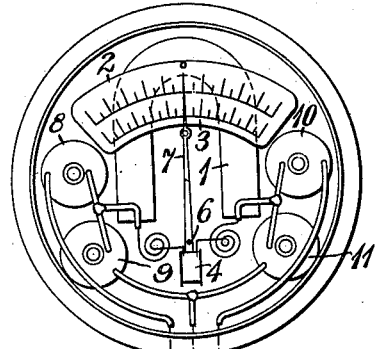
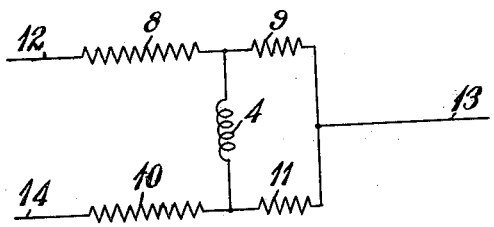
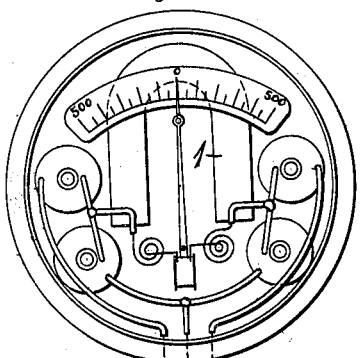
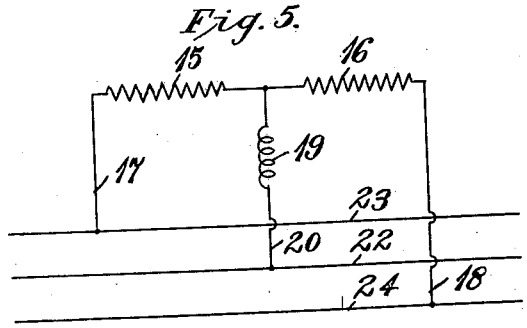
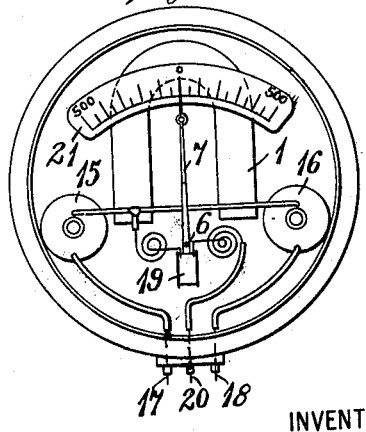
WITNESSES:
Fred H. Miller
R. J. Dearborn
INVENTOR
Harold W. Brown
BY
Wesley G. Carr
ATTORNEY

H. W. BROWN.
ELECTRIC MEASURING INSTRUMENT.
APPLICATION FILED JAN. 21, 1909.

1,013,123.

Patented Jan. 2, 1912.
2 SHEETS—SHEET 2.

WITNESSES:
Fred H. Miller
R. J. Dearborn

INVENTOR
Harold W. Brown
BY
Wesley G. Carr
ATTORNEY

UNITED STATES PATENT OFFICE.

HAROLD W. BROWN, OF WILKINSBURG, PENNSYLVANIA, ASSIGNOR TO WESTINGHOUSE ELECTRIC & MANUFACTURING COMPANY, A CORPORATION OF PENNSYLVANIA.

ELECTRIC MEASURING INSTRUMENT.

1,013,123.      Specification of Letters Patent.      Patented Jan. 2, 1912.

Application filed January 21, 1909. Serial No. 473,561.

*To all whom it may concern:*

Be it known that I, HAROLD W. BROWN, a citizen of the United States, and a resident of Wilkinsburg, in the county of Allegheny and State of Pennsylvania, have invented a new and useful Improvement in Electric Measuring Instruments, of which the following is a specification.

My invention relates to electric measuring instruments and it has for its object to provide a measuring instrument of the so called "differential" type by means of which either the voltage of a single circuit, or the difference in voltage between two independent or two interconnected circuits, may be indicated.

Modifications of my device may also be employed as a ground detector or for indicating an unbalanced voltage in a three-wire distributing circuit in which one of the circuit conductors is normally at a potential midway between the potentials of the other two conductors.

Differential voltmeters and similar measuring instruments have hitherto been composed of two movable coils which were independently supplied with energy from the circuits, the potential difference of which it was desired to measure.

According to my present invention, I so utilize a plurality of ohmic resistances that only a single movable coil, similar to that found in ordinary voltmeters, is necessary, thereby making a simple mechanical embodiment of the device possible. The circuit connections of the instrument are so adjusted that there is no error introduced when the device is employed in connection with interconnected circuits.

Figure 7:
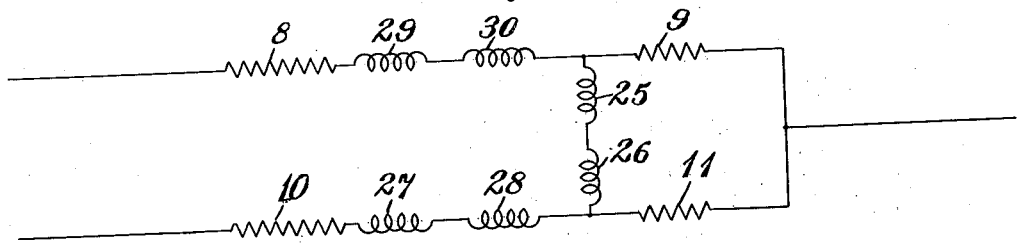
Figure 8:
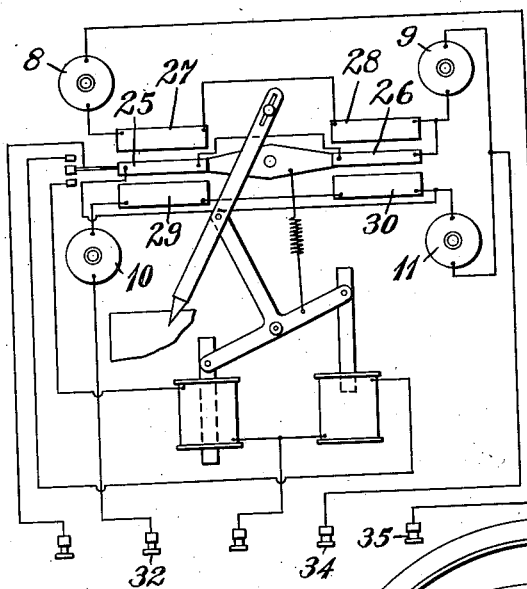
Figure 10:
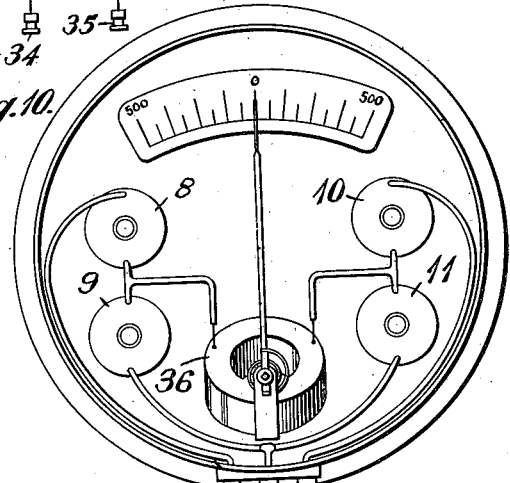
Figure 9:
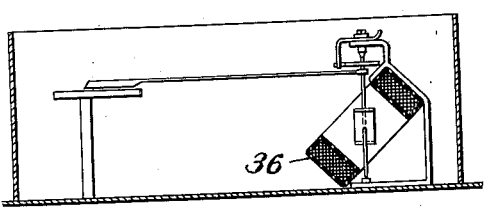

Figure 1 of the accompanying drawings is a diagram of the circuit connections for one embodiment of my invention, Figs. 3 and 5 are similar views of other embodiments of my invention and Figs. 2, 4 and 6 are diagrammatic views of electrical measuring instruments corresponding, respectively, to the diagrams of Figs. 1, 3 and 5. Figs. 7 and 8 are, respectively, a diagram of the circuit connections and a diagrammatic view of a recording instrument embodying my invention, and Figs. 9 and 10 are, respectively, a diagrammatic elevation and a diagrammatic plan view of an indicating instrument of the inclined coil type embodying my invention.

Any of the arrangements illustrated may be utilized as a simple voltmeter for correctly indicating the potential of a single circuit.

Referring to Figs. 1 and 2 of the drawings, the device illustrated comprises a permanent horseshoe magnet 1, stationary dials 2 and 3, a single coil 4 which is rotatably mounted upon an axis 6, a pointer 7 and relatively high non-inductive resistances 8, 9, 10 and 11. The instrument is provided with three terminal binding posts 12, 13 and 14, terminals 12 and 14 being adapted to be connected to positive circuit conductors, as indicated in the diagram of Fig. 1. The resistances 8 and 9 are connected in series between the terminals 12 and 13, the resistances 10 and 11 being similarly connected between the terminals 14 and 13 and the movable coil 4 serving to interconnect the two circuits, its terminals being, respectively, connected to the junctions of the resistances 8 and 9, and 10 and 11.

If the terminals 12 and 14 are respectively connected to the positive terminals of two circuits and the negative terminals of both circuits are connected to the terminal 13, the instrument pointer 7 will indicate the true difference between the voltages of the circuits on the dial 3. This is true whether or not the circuits are independent of each other, but, if it is desired to obtain a voltage reading for a single circuit, the positive conductor of the circuit should either be connected to the meter terminal 12 or the meter terminal 14 and the negative conductor of the circuit to the meter terminal 13, no connection being made to the third terminal, whereupon the pointer 7 will indicate the true voltage of the circuit on the instrument dial 2.

As connected in Fig. 1, the instrument gives a correct differential reading when connected to either independent or interconnected circuits.

The fact that two dials are necessary when the resistances are equal, may be demonstrated as follows: If it be assumed that the ohmic resistance of the coil 4 is negligible and that the value of each of the resistances 8, 9, 10 and 11 is substantially 6000 ohms, when a single circuit is connected to the meter, one-half of the total current traversing the meter passes through the coil and the total current is determined by an effective resistance of 9000 ohms. But, if the meter is connected differentially to two circuits, two-thirds of the total current passes through the coil 4 and the effective resistance, which opposes the current produced by the voltage difference, is substantially 8000 ohms. This is evident from the fact that when a single voltage is applied to the terminals 14 and 13, for example, one circuit is completed from the terminal 14 through resistance 10, coil 4, and resistance 9 to the terminal 13, another circuit being completed through the resistances 10 and 11 to the terminal 13. On the other hand, if the same voltage is applied to the same terminals 14 and 13 and if 0 voltage is applied to the terminals 12 and 13 (i. e. if these terminals are short circuited), three circuits are completed as follows: one from the terminal 14 through resistances 10 and 11 to terminal 13, a second from terminal 14 through resistance 10, coil 4 and resistance 9 to terminal 13 and a third from terminal 14 through resistance 10, coil 4, resistance 8 and the short circuit connection indicated above, to terminal 13.

A single dial may be utilized for indicating either the voltage of a single circuit or for indicating the difference in voltage between two circuits differentially connected if the arrangement and proportioning of resistances illustrated in Fig. 3 is employed. As here shown, the connections between the coil 4 and the resistances 8 and 9, and between resistances 10 and 11, respectively, are the same as in Fig. 1, but the ohmic values of resistances 9 and 11 are made relatively low. Assuming that the values of the resistances 8 and 10 are each 6000 ohms, the values of the resistances 9 and 11 each 100 ohms and the resistance of the coil 4, 50 ohms, if the various circuits are considered, as in the diagram of Fig. 1, it is evident that approximately four-tenths of the total current traversing the meter will flow through the coil, in either case. The total current will be dependent upon a resistance of approximately 6,060 ohms in either case, the difference in the current traversing the coil 4 and the discrepancy in the meter indication being clearly negligible.

The resistances 9 and 11 may, of course, have any suitable ohmic values which are low as compared with the ohmic values of the resistances 8 and 10, but they are preferably somewhat higher than the ohmic resistance of the coil 4 in order that sufficient current may pass through the coil to produce the usual torque in the moving element of the instrument. In order to minimize the error introduced by temperature variations, it is preferable to construct the resistances 9 and 11 of low ohmic value, of the same material, or of a material having the same temperature coefficient as that used in the winding of the coil 4. The resistances 8 and 10 of high ohmic value should be constructed of any well known resistance material having a zero temperature coefficient.

Reference may now be had to Figs. 5 and 6, in which the modified arrangement is shown which comprises resistances 15 and 16, connected in series between terminals 17 and 18 of the instrument, and a coil 19 which is interposed between the junction of the resistances 15 and 16 and a meter terminal 20. The structure of the instrument is similar to that of Figs. 2 and 4, a single dial 21 being provided.

The device shown in Figs. 5 and 6 is adapted to correctly indicate the voltage of a single circuit when connected across the terminals 17 and 20 or across the terminals 18 and 20. The device is also adapted to indicate an unbalanced condition in a three-wire system of distribution, the neutral conductor 22 being connected to the terminal 20 and the other conductors 23 and 24 being connected, respectively, to the terminals 17 and 18. In either case, the current traversing the coil 19 will be dependent upon the voltage, or the difference in the voltages, applied, and the ohmic value of one of the resistances 15 and 16, which are equal to each other. The device shown in Figs. 5 and 6 may also be used as a ground detector, the terminal 20 being connected to earth while the terminals 17 and 18 are connected to the circuit conductors of the ungrounded line.

Figs. 7 and 8 are views, corresponding, respectively, to Figs. 3 and 4, of a recording instrument of the "Kelvin balance" type, arranged to record either the voltage of a single circuit or the voltage difference between two circuits. The moving coils 25 and 26 correspond to the coil 4, the coils 27, 28, 29 and 30 take the place of the permanent magnet in Fig. 4 and terminals 32, 34 and 35 correspond, respectively, to terminals 12, 13 and 14.

Figs. 9 and 10 are, respectively, a diagrammatic elevation and a diagrammatic plan view of a voltmeter of the "inclined coil" type, arranged in accordance with my invention, the circuit connections for the meter being the same as those of Fig. 3 and the stationary coil 36 being substituted for the moving coil 4.

It is evident that the form of the meter mechanism is not material to my invention and that mechanisms other than those illustrated may be adapted for use as differential voltmeters by following the general circuit arrangement of any one of the diagrams shown in Figs. 1, 3 and 7.

Furthermore, I deem it unnecessary to illustrate adaptations of specific forms of meter mechanisms, such as the "inclined coil" type for ground detectors, since anyone skilled in the art can readily follow the general circuit arrangement of Fig. 5 in securing this result. In arranging the "Kelvin balance" type of meter mechanism for a ground detector, stationary coils of the balance should be connected in series between the resistances 15 and 16 (see Fig. 5) and the movable coils interposed in series relation between the middle point of the group of stationary coils and the ground terminal of the instrument.

Other types of electric measuring instruments may, of course, be arranged to produce ground detectors which are equivalent to those already described.

The circuit connections illustrated may be varied within the spirit and scope of my invention, and I desire that only such limitations shall be imposed as are indicated in the appended claims.

I claim as my invention:

1. A measuring instrument comprising two circuits having a common terminal, a low resistance movable coil, a pair of equal resistances of high ohmic value, a pair of equal resistances of low ohmic value, the terminals of said coil being connected to the two circuit terminals of one polarity through the resistances of high ohmic value and to the common terminal of opposite polarity through the resistances of low ohmic value.

2. A differential voltmeter comprising a stationary dial, a movable coil, a pointer secured thereto, and two sets of similar resistances each comprising a resistance of high ohmic value and a resistance of relatively low ohmic value, said sets of resistances being severally connected in series with a pair of circuits having a common terminal, and said coil serving to interconnect the circuits between the resistances, the resistances of low ohmic value being adjacent to the common terminal.

3. A differential voltmeter comprising two circuits having independent positive terminals and a common negative terminal, a resistance of high ohmic value and a resistance of low ohmic value in each circuit, the resistance of low ohmic value being adjacent to the common terminal, a coil serving to interconnect the circuits between the resistances, a stationary dial and a pointer actuated by the coil and coöperating with the dial to indicate either a true voltage value for a single circuit or a true differential voltage value for two interconnected circuits.

In testimony whereof, I have hereunto subscribed my name this 15th day of January, 1909.

HAROLD W. BROWN.

Witnesses:
WM. BRADSHAW,
BIRNEY HINES.